United States Patent
Wu et al.

(10) Patent No.: US 9,078,267 B2
(45) Date of Patent: Jul. 7, 2015

(54) CHANNEL SELECTION METHOD FOR WIRELESS NETWORKS

(75) Inventors: Mingquan Wu, Princeton Junction, NJ (US); Hang Liu, Yardley, PA (US); Ishan Mandrekar, Monmouth Junction, NJ (US); Ramkumar Perumanam, Edison, NJ (US); Saurabh Mathur, Monmouth Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 424 days.

(21) Appl. No.: 13/138,385

(22) PCT Filed: Feb. 18, 2009

(86) PCT No.: PCT/US2009/001005
§ 371 (c)(1),
(2), (4) Date: Aug. 9, 2011

(87) PCT Pub. No.: WO2010/096029
PCT Pub. Date: Aug. 26, 2010

(65) Prior Publication Data
US 2011/0292897 A1 Dec. 1, 2011

(51) Int. Cl.
H04W 72/04 (2009.01)
H04W 72/06 (2009.01)

(52) U.S. Cl.
CPC ................. *H04W 72/0486* (2013.01)

(58) Field of Classification Search
CPC .................... H04W 72/0486; H04W 72/0406; H04W 72/06
See application file for complete search history.

(56) References Cited

U.S. PATENT DOCUMENTS

| | | | |
|---|---|---|---|
| 5,884,145 A | 3/1999 | Haartsen | |
| 6,567,397 B1* | 5/2003 | Compana, Jr. et al. | 370/349 |
| 6,996,075 B2 | 2/2006 | Santhoff et al. | |
| 8,588,113 B2 | 11/2013 | Wu et al. | |
| 2005/0047383 A1 | 3/2005 | Yoshida | |
| 2005/0245258 A1 | 11/2005 | Classon et al. | |
| 2008/0101331 A1 | 5/2008 | Lee et al. | |
| 2008/0130573 A1 | 6/2008 | Lee et al. | |
| 2009/0129331 A1 | 5/2009 | Wu et al. | |
| 2009/0291692 A1* | 11/2009 | Kazmi et al. | 455/452.2 |

FOREIGN PATENT DOCUMENTS

| | | |
|---|---|---|
| EP | 1615388 | 1/2006 |
| EP | 2020779 | 2/2009 |
| WO | WO2005112358 | 11/2005 |

OTHER PUBLICATIONS

Bakhshi et al., "A Maximum Fair Bandwidth Approach for Channel Assignment in Wireless Mesh Networks", IEEE Communications Society, Tehran, Iran, 2008 IEEE. pp. 2176-2181.

(Continued)

*Primary Examiner* — Jianye Wu
(74) *Attorney, Agent, or Firm* — Robert D. Shedd; Jerome G. Schaefer

(57) ABSTRACT

A method and apparatus are described including categorizing each channel into one of four categories, selecting a channel from a first category of channels, if there are any channels in the first category of channels, selecting a channel from a second category of channels, if there are any channels in the second category of channels and selecting a channel from a third category of channels, if there are any channels in the third category of channels.

20 Claims, 7 Drawing Sheets

(56) References Cited

OTHER PUBLICATIONS

Chan et al., "A Jumping-Genes Paradigm for Optimizing Factory WLAN Network", IEEE Transactions on Industrial Informatics, vol. 3, No. 1, Feb. 2007, pp. 33-43.

Zhang et al., "Mitigation of Exposed Terminal Problem Using Packet Sensing", Communication Networks and Services Research Conference, 2008 IEEE, China, 2008, pp. 263-269.

Wu et al., Channel Selection for Video Distribution over WLANs in Dense Deployment, Corporate Research Labs, Princeton, New Jersey.

Search Report Dated Nov. 24, 2009.

Wu et al., Channel Selection for Video Distribution over WLANs in Dense Deployment, Corporate Research Labs, Princeton, New Jersey. Apr. 7, 2009.

* cited by examiner

CHANNEL SELECTION METHOD FOR WIRELESS NETWORKS

This application claims the benefit, under 35 U.S.C. §365 of International Application PCT/US2009/001005, filed Feb. 18, 2009, which was published in accordance with PCT Article 21(2) on Aug. 26, 2010 in English.

FIELD OF THE INVENTION

The present invention relates generally to wireless local area networks (WLANs) and, in particular, to channel assignment methods and apparatus in dense deployment environments.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire set. That is, multicast may include broadcast and is therefore a broader term than broadcast as used herein. Data/content is transmitted in packets or frames. As used herein a station can be a node or a client device, which can be a mobile terminal or mobile device such as, but not limited to, a computer, laptop, personal digital assistant (PDA) or dual mode smart phone. Specifically, a wireless device may be a mobile device but a wireless device may also be fixed and not moving for a particular period of time. The present invention is applicable to multimedia applications including but not limited to audio, video and any other multimedia applications. Video is used as an exemplary embodiment herein.

Recently there has been a rapid and significant increase of wireless network deployment on school and work campuses, in shopping malls, at libraries, airports, at homes, etc. Emerging technologies such as IEEE 802.11n make delivering multimedia content over wireless links possible. Thus, the technology is being driven deeper into our daily lives. The number of interference free channels is limited. In a dense deployment environment, wireless networks tend to interfere with each other. This interference impacts the throughput of wireless networks and thus, the quality of service for multimedia streaming applications. The present invention is directed to channel assignment methods and apparatus that will optimize the channel usage, promote channel reuse and improve the throughput as well as quality of service for multimedia applications.

A great deal of work has been done regarding channel assignment in cellular networks. The infrastructure of a cellular network is, however, quite different from that of an IEEE 802.11 wireless local area network. In a cellular network, each base station may have one or more channels. Through careful channel planning by the operator to avoid interference, neighboring base stations will not share the same channel. An IEEE 802.11 wireless local area network may include one or more basic service sets (BSS). Each BSS includes an access point (AP) and the clients that are associated with the AP. Each BSS is assigned one channel. The AP and the clients share the same channel using carrier sense multiple access/collision avoidance (CSMA/CA) MAC layer protocol. In fact, based on CSMA/CA, two or more neighboring BSSs may share the same channel if the sum of the load of each BSSs is less than the channel capacity.

Channel assignment has also been studied extensively in multihop wireless networks such as wireless mesh and ad hoc networks. Existing multihop wireless networks often use off-the-shelf IEEE 802.11 MAC layer protocol products and algorithms. Data or content may need to be transmitted over multiple wireless hops before reaching a destination. Conventional channel assignment algorithms in multihop wireless networks often assume a mobile device in the network has two or more wireless interfaces, and conventional channel assignment algorithms are further constrained by issues such as routing efficiency and connectivity of the network. These algorithms do not work well for densely deployed wireless local area networks operating in the infrastructure mode.

Conventional channel assignment methods for WLANs adopt a static, one-time channel assignment approach. A network administrator conducts a site survey and performs layout planning, and then manually assigns channels to APs such that the assignments experience minimum interference. This approach does not adapt well to a dynamic environment. Recent proposals have focused on automatic channel assignment. In one such proposal, the least congested channel selection (LCCS) algorithm, the AP periodically scans the channels and selects the least congested channel. LCCS is AP-centric in nature. It does not detect any client side conflicts. In another recent proposal, a client-driven approach for channel assignments targeted conventional WLANs and is not suitable for WLANs that are designed specifically for multimedia applications where there are strict constraints on the demand and bit rate for each client. In another recent proposal, the demand at each demand point needs to be explicitly specified, and channels are assigned to APs such that channel usage is maximized. However, in the problem formulation, it was assumed that interference between APs was symmetric, and neighboring APs were assigned to interference free channels. This is not necessarily true in practical deployments, as neighboring APs may have different power levels and thus different interference ranges, so the interference may not be symmetric. Also if the total demand on neighboring APs is lower than the channel capacity, neighboring APs can be assigned the same channel. In yet another recent proposal, a traffic aware channel assignment method was introduced. However, this model also assumed symmetric interference and did not address the hidden and exposed terminal problem.

IEEE 802.11h has defined dynamic frequency selection (DFS). DFS selects a channel for a mobile device to avoid interference with radar and/or satellite signals, and is not designed to improve the overall performance of a wireless network in a dense deployment environment.

SUMMARY OF THE INVENTION

Recently there has been a rapid and significant increase of wireless network deployment on school and work campuses, in shopping malls, at libraries, airports, at homes, etc. Emerging technologies such as IEEE 802.11n make delivering multimedia content over wireless links possible. Thus, the technology is being driven deeper into our daily lives. The number of interference free channels is limited. In a dense deployment environment, wireless networks tend to interfere with each other. This interference impacts the throughput of wireless networks and thus, the quality of service for multimedia streaming applications. The present invention is directed to channel assignment methods and apparatus that will optimize the channel usage, promote channel reuse and improve the throughput as well as quality of service for multimedia applications.

A centralized approach to channel selection in dense deployments is described in another patent application (PCT U.S. Ser. No. 09/001,015) of Applicants filed concurrently herewith. The distributed method of the present invention has the advantage over the centralized algorithm in that: 1) no message exchange is needed between APs or APs and a centralized server and 2) easy deployment and maintenance. The distributed channel selection method of the present invention is client aware and solves the hidden and exposed terminal problems that are inherent to the least congested channel selection (LCCS) algorithm.

A method and apparatus are described including categorizing each channel into one of four categories, selecting a channel from a first category of channels, if there are any channels in the first category of channels, selecting a channel from a second category of channels, if there are any channels in the second category of channels and selecting a channel from a third category of channels, if there are any channels in the third category of channels.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
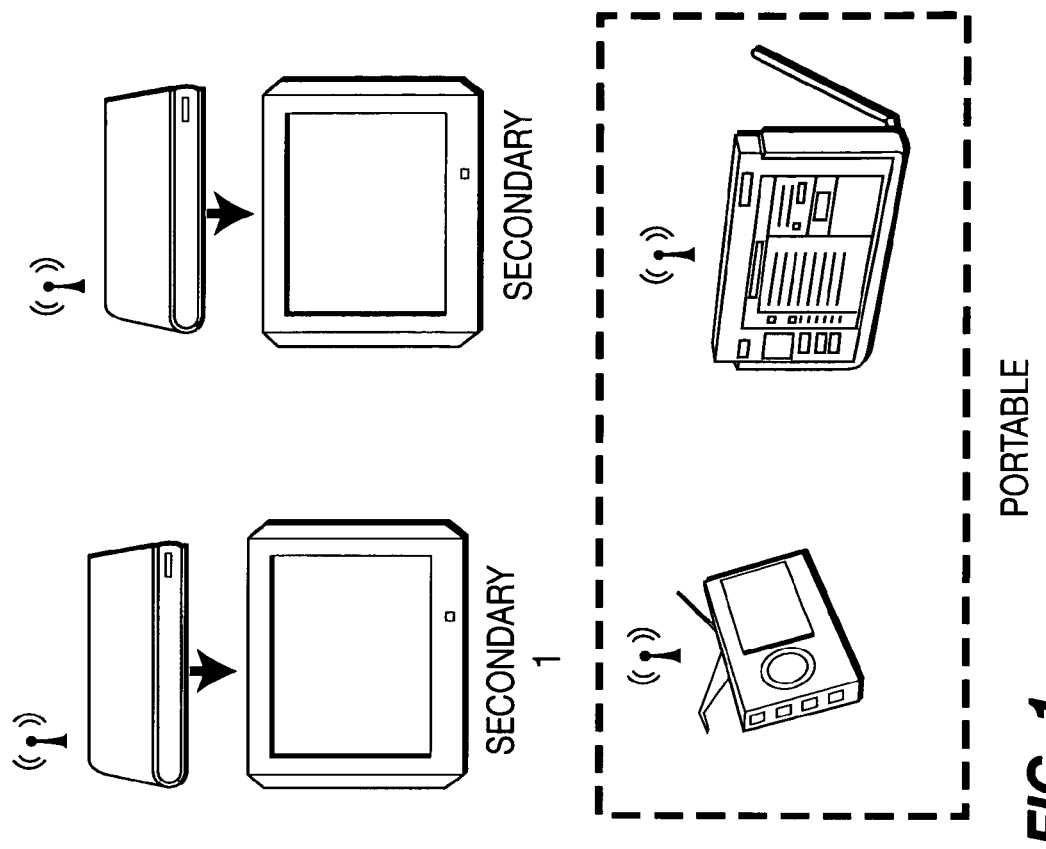
FIG. 1 shows a typical in-home wireless video distribution system streaming two or three HD/SD TV and video-on-demand (VoD) programs from a master set top box (STB) to slave STBs.
Figure 1:
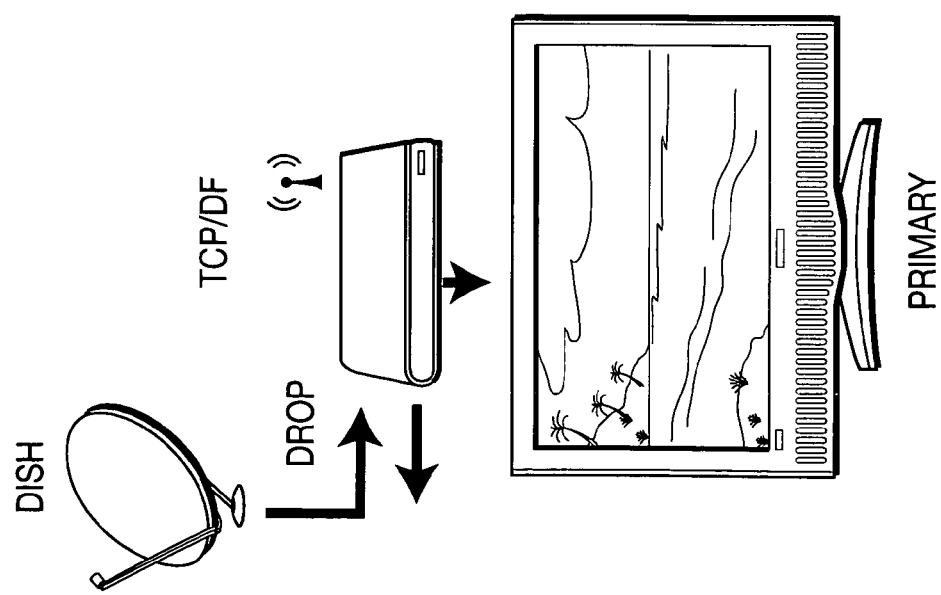

Emerging technologies such as orthogonal frequency divisional multiplexing (OFDM) and multiple in-multiple out (MIMO) make bandwidth demanding multimedia applications over wireless channels possible. In IEEE 802.11n, throughput over a 20 MHz or 40 MHz channel can reach 130 Mbps or 300 Mbps respectively. Transport of a high-definition video stream may need 15 Mbps to 20 Mbps bandwidth. A typical in-home wireless video distribution system streams two to three HD/SD TV and VoD programs from a master set top box (STB) to slave set top boxes as shown in FIG. 1. For single family home deployments, if the distances between homes are great enough, the number of interfering neighbors may be smaller than the total channels available. It would, thus, be possible for the in-home wireless network to find an interference free channel.

Figure 2:
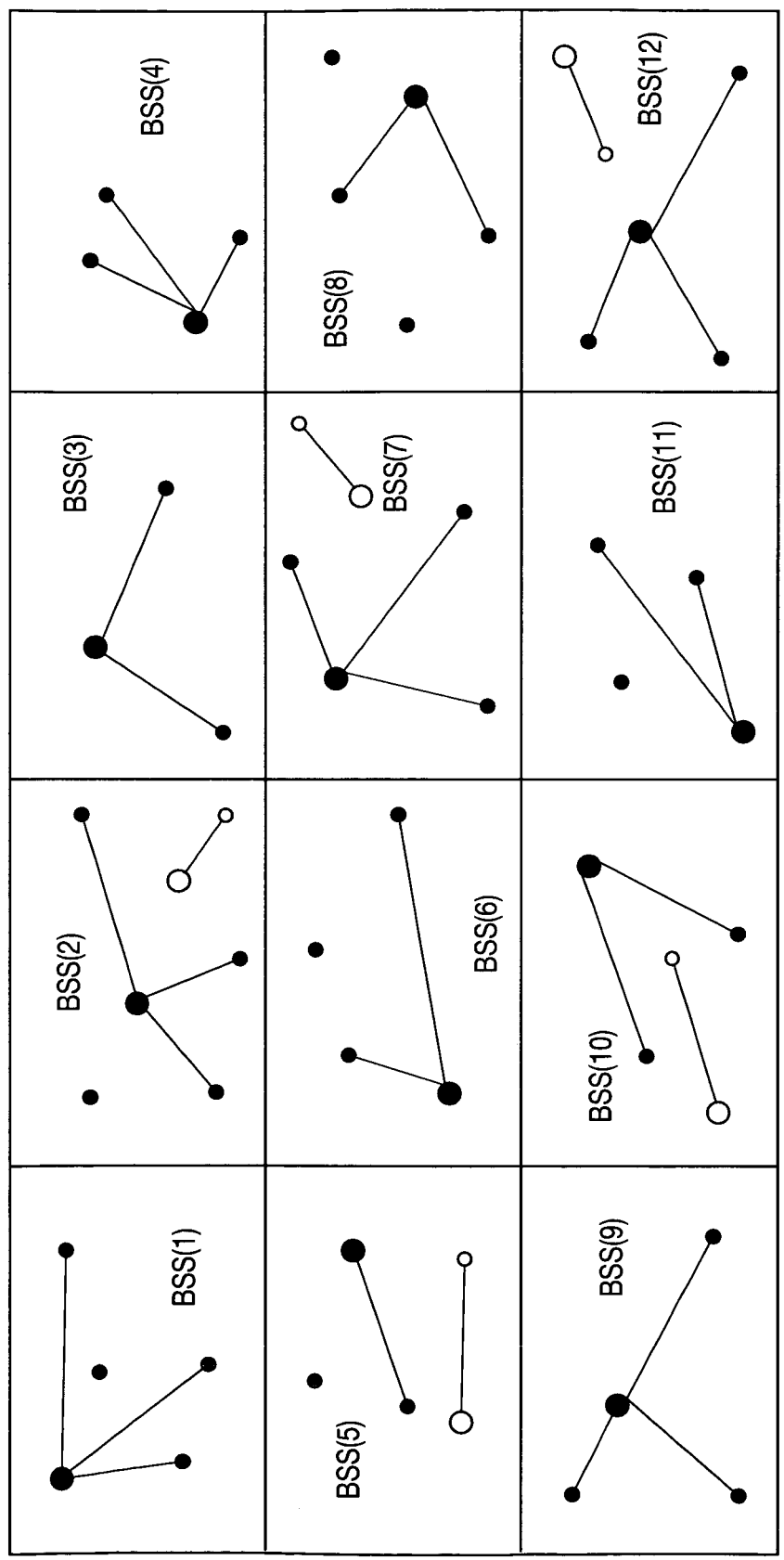
FIG. 2 shows a multi-dwelling unit (MDU) deployment.

This may not be the case for multi-dwelling unit (MDU) deployment as shown in FIG. 2. One AP and its associated STAs form a basic service set (BSS). Different BSSs may come from different service providers. As used herein, nodes include clients, mobile terminal and mobile devices. Such devices can be, but are not limited to, computers, laptops, personal digital assistants (PDAs), set top boxes and the like. In FIG. 2, the nodes that are filled are APs and stations that are used exclusively for video streaming. These BSSs come from one service provider, and can be managed by a centralized server/administrator. Herein, these BSSs are called cooperative BSSs. The nodes that are not filled in are APs and stations that are used for general data delivery and they may come from other service providers. Herein, these BSSs are called non-cooperative BSSs. A cooperative BSS may be subject to interference from cooperative and non-cooperative BSSs within the same multi-dwelling unit. A cooperative BSS may also be subject to interference from BSSs within neighboring multi-dwelling units and office buildings. In such a dense deployment scenario, the number of interfering neighbors of a BSS may be more than the total number of channels available. Therefore, channel assignment is necessary to minimize the interference and guarantee quality of service. The scenario depicted in FIG. 2 will be used to describe the method of channel assignment of the present invention. It is understood that the method of the present invention can be applied to channel assignment for wireless networks in general, for wireless networks in dense deployments in particular.

The distributed channel selection method of the present invention does not require message exchange between cooperative BSSs, or between cooperative BSSs and non-cooperative BSSs. However, differentiation between cooperative BSSs and non-cooperative BSSs may have some benefits. For an example, APs from cooperative BSSs may broadcast their load information in their beacons, which is less costly and more accurate than estimating loads of neighboring BSSs by scanning each channel and measuring the average fraction of busy time of each channel.

Figure 3:
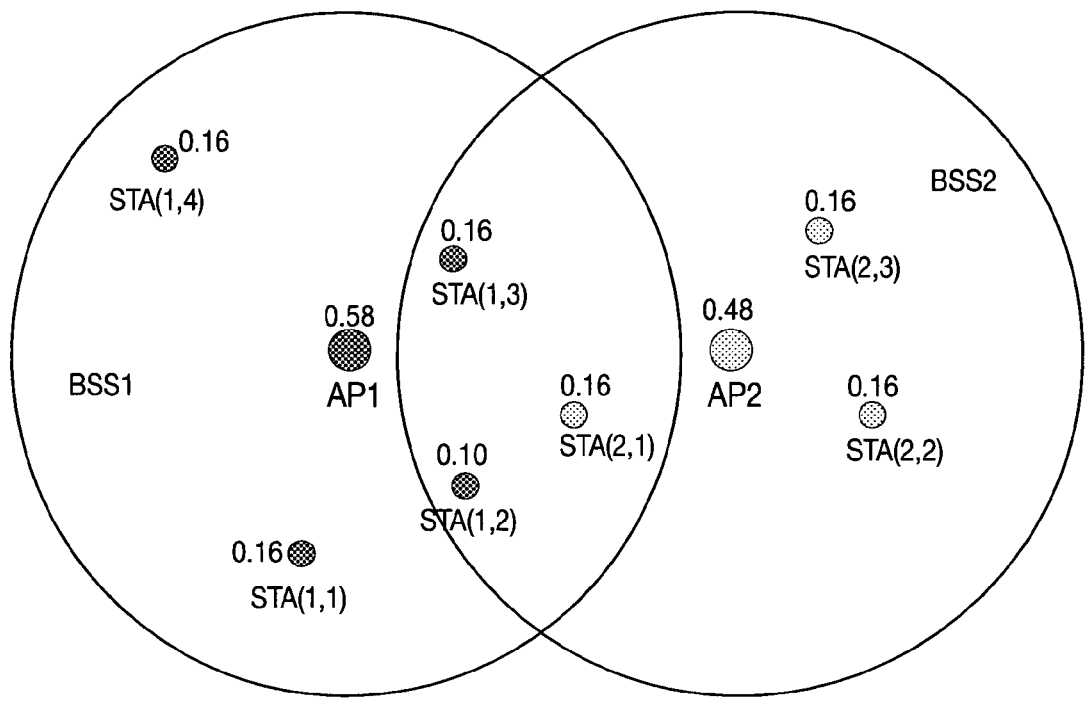
FIG. 3 depicts the hidden terminal problem.
Figure 4:
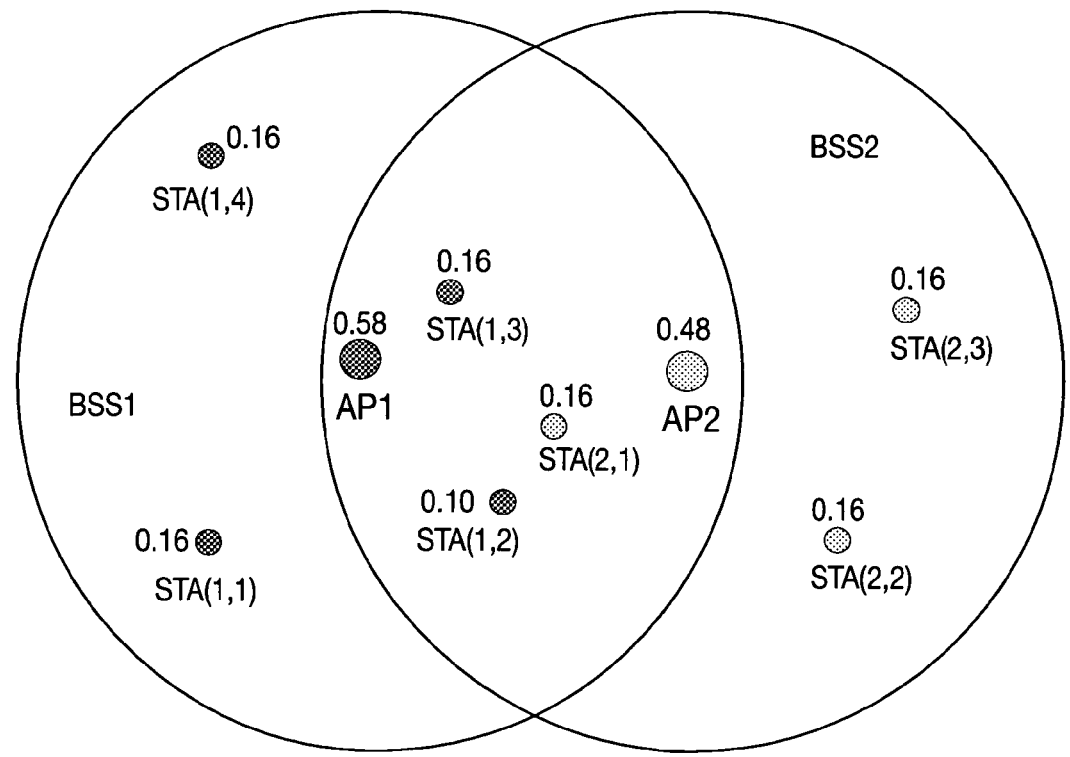
FIG. 4 depicts the exposed terminal problem.

As discussed above, the least congested channel selection method is a distributed channel selection method, but only APs scan all the channels. This may cause hidden terminal problems at both the client side and the AP side. For an example, in FIG. 3, in BSS1, if only AP1 scans the channel, AP1 may select a channel that AP2 is using, thus causing hidden terminal problem at clients STA (1,2) and STA (1,3). For a multimedia streaming application, this may cause a large number of packets to be/arrive corrupted at the client side, and thus decrease the quality of the distributed media. Similarly, in FIG. 4, AP1 may decide to use the same channel as AP2, because the load on AP2 is light and the loads on other channels are heavier. STA (1,1) and STA (1,4) do not know that this channel is used by AP2 and STA (1,1) and STA (1,4) may transmit uplink traffic at the same time that AP2 is transmitting resulting in packet collisions at AP1.

In the distributed channel selection method of the present invention, when a AP decides that a channel switch is necessary, it will scan all the channels and send a request to its associated clients to scan all the channels; or to speed up channel switching, both APs and their clients may do periodic background scanning. The clients report their scanning results back to their associated AP. When the number of clients is not very large, this will not cause much overhead, which is especially true for the multimedia/video streaming scenario. In a hotspot wireless network where there are many clients associated with an AP, a number of representative clients can be selected from among all of the clients to scan the channels and report the results back to the AP. The scanning results include a list of neighboring BSSs of which this station is in the interference range. Each item in the list includes the SSID of a BSS, the channel this BSS is using/working on/communicating over, and the average busy time fraction (load). It should be noted that in the list there may be one or more BSSs working on the same channel.

IEEE 802.11h has defined a signaling scheme for an AP to signal its associated clients to scan channels and report results on a schedule, which can also be used for the channel selection method of the present invention. For a station that has a single radio, in order to scan channels that are different from the working channel, current communication would have to be interrupted, channel scanning should be scheduled at times when the traffic load is low. In the future, as the cost is reduced, it would be an advantage to embed a dedicated radio in a wireless chip set for the purpose of channel scanning.

After an AP has received the results from all its clients (or a representative subset), the AP calculates the load on each channel. It should be noted that the same BSS may be shown on the scanning results of the AP of one or more of the clients. In this case, the AP will take the average of the loads from the scanning results as the load of this neighboring BSS. The AP builds a list of interfering BSSs that may cause hidden terminal and exposed terminal problems using the following criteria:

If the AP and all of its clients have heard the other AP, then this BSS is in the interference range of the other AP.

If the AP did not hear the other AP, but one or more of its clients have heard the AP, then these clients are in the interference range of the other AP, and these clients are hidden terminals.

If the AP has heard the other AP, but one or more of its clients did not hear the AP, then these clients are exposed terminals.

If a neighboring BSS appears on this list, its load will be weighted by a factor $1+\omega$, where $\omega$ is a number between 0 and 0.2. If the AP is assigned the same channel as this neighboring BSS, RTS/CTS signaling has to be turned on, which increases overhead. The overhead is accounted for by weighting the load. The AP then calculates the load on each channel, if there are multiple BSSs using the same channel, the load of this channel would be the sum of all the loads of the BSSs that are communicating over this channel.

In the distributed channel selection method of the present invention, the AP selects a free or least loaded channel once the AP has the scanning results from itself and all the clients (or a representative subset) that are associated with the AP. If the AP selects a channel that may cause hidden or exposed terminal problems, it activates RTS/CTS signaling. It should be noted that when a new BSS is added to the network and selects a channel, it may cause hidden terminal or exposed terminal problems to the BSSs already in the network that are using that channel. As described later, an existing BSS may periodically perform background scanning which will help the AP identify a hidden terminal or exposed terminal problem and activate RTS/CTS signaling. Also if the packet loss rate of an existing BSS exceeds a certain value/threshold, that event may trigger the channel switching procedure, which may also uncover a hidden terminal and exposed terminal problem.

Using channel scanning to measure the load on each channel is an expensive operation, especially if an AP or mobile station/client/node has only one radio. The AP or mobile station needs to scan each channel, and has to stay on that channel for a long enough period of time to make a measurement. This may cause interruption of any current communication. Also it is difficult to make an accurate measurement as load on a channel may change dramatically due to burst data traffic. As an alternative approach for measuring the load, cooperative APs can advertise their load in beacons and probe responses. On channels with only cooperative BSSs, the load on the channel can be calculated deterministically. On channels with both cooperative BSSs and non-cooperative BSSs, if the load of non-cooperative BSSs is not known, the load information provided by cooperative APs cannot be used to calculate the share of the bandwidth a cooperative BSS can get. In this case, it is assumed that cooperative BSSs and non-cooperative BSSs will compete for the channel and the load/available bandwidth can be estimated based on the number of APs.

Assume that the channel capacity is C, the set of existing cooperative BSSs (not including the BSS that is going to select a channel if it has been working on this channel) on the channel is $N_c$ and the set of non-cooperative BSSs on the channel is $N_n$. The BSS that is going to select a channel is represented by $N_e$, the available bandwidth for this BSS is represented by $C_e$. $|X|$ is used to represent the cardinal number of set X, so $|N_c|$ is the number of cooperative APs and $|N_n|$ is the number of non-cooperative APs.

In the case where there are no non-cooperative BSSs on the channel, cooperative APs advertise their load in beacons and the available bandwidth for the BSS selecting the channel would be:

$$C_e = \left(1 - \sum_{i \in N_c} L_i\right) C$$

where $L_i$ is the load on cooperative BSS i, which is measured as a fraction of busy time.

When there are non-cooperative APs using the channel, in the worst case, if each transmission attempt from a cooperative and non-cooperative BSS has an equal probability to gain access to the channel, the available bandwidth for the BSS is:

$$C_e = \frac{\theta}{\sum_{i \in N_c \cup N_n \cup N_e} \frac{1}{R_i}}$$

where $R_i$ is the average transmission rate on BSS i, $0 < \theta \leq 1$ is the ratio of actual throughput to the throughput bound/limit. If all the BSSs transmit at the maximum rate (capacity rate), the above equation becomes:

$$C_e = \frac{\theta C}{|N_c| + |N_n| + 1}$$

If cooperative BSSs (and their corresponding APs) are used exclusively for multimedia/video/audio transmission and more aggressive wireless multimedia (WMM) parameters are used than those generally used for data communication, cooperative BSSs may have the advantage in the contention for the shared channel, and may get more than the average portion of the channel, the above equation can be modified as:

$$C_e = \frac{\theta w_c}{\sum_{i \in N_c \cup N_e} \frac{w_c}{R_i} + \sum_{i \in N_n} \frac{w_n}{R_i}} \approx \frac{\theta w_c C}{w_c(|N_c|+1) + w_n |N_n|}$$

where $w_c$ and $w_n$ are the weight assigned to cooperative BSSs and non-cooperative BSSs, with $w_c \geq w_n$. Based on testing, the BSS (and its associated AP) using aggressive WMM parameters can access about 90 Mbps out of 110 Mbps total throughput, the BSS (and its associated AP) using default WMM values only gets about 20 Mbps.

To help an AP to select a channel, the channels can be classified into the following categories:

clear channel: no BSS is working on this channel.

feasible channel: the total load of this BSS and its neighboring BSSs within the carrier sense range is less than the capacity of the channel or the available bandwidth is greater than the demand on this BSS. When there are non-cooperative BSSs using/working on/communicating over this channel, the available bandwidth is estimated according to the worst case.

infeasible channel: there are cooperative BSSs or non-cooperative BSSs using this channel and the total load of this BSS and its neighboring cooperative BSSs in the carrier sense range is greater than the channel capacity undetermined channel: there are non-cooperative BSSs using this channel, if there are cooperative BSSs using this channel, the total load of this BSS and it neighboring cooperative BSSs in the carrier sense range is less than the capacity of the channel, but the available bandwidth estimated according to the worst case is less than the demand on this BSS.

Figure 5A:
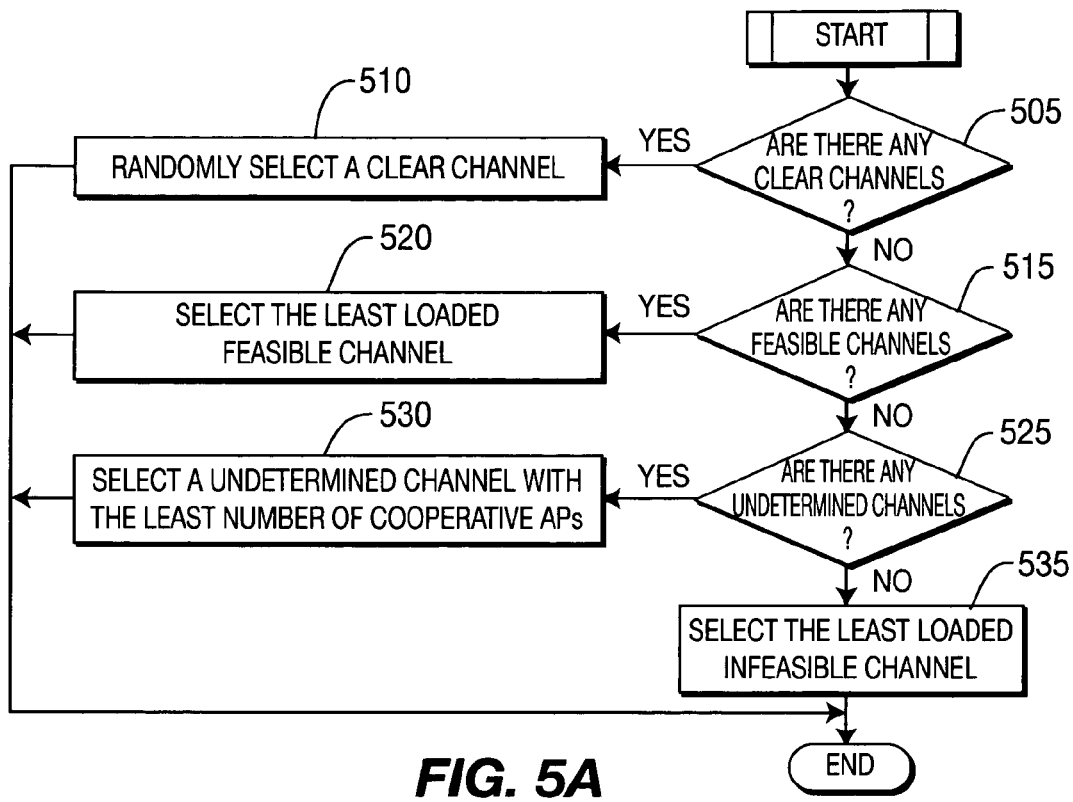
FIG. 5A is a flowchart of the AP channel selection method in accordance with the principles of the present invention.

When an AP needs to switch to a new channel, it executes/follows the channel selection method below, the flowchart of the channel selection procedure is shown in FIG. 5A.

Randomly select a clear channel if such a clear channel is available.

Otherwise select the least loaded feasible channel.

Otherwise select an undetermined channel that has the lowest number of cooperative BSSs.

Otherwise select an infeasible channel with the lowest number of cooperative BSSs.

Specifically, a test is performed at 505 to determine if there are any clear channels. If there are any clear channels then at 510, the AP randomly selects a clear channel (if there are more than one clear channel or selects the single clear channel if there is only one clear channel) and proceeds to use the selected channel for future communication. If there were no clear channels detected then a test is performed at 515 to determine if there are any feasible channels. If any feasible channels were detected then at 520, the AP selects the least loaded feasible channel (if there are more than one feasible channel or selects the single feasible channel if there is only one feasible channel) and proceeds to use the selected channel for future communication. If there were no feasible channels then a test is performed at 525 to determine if there are any undetermined channels. If undetermined channels are detected then at 530 the undetermined channel having the lowest number of cooperative BSSs (APs) is selected by the AP (if there are more than one undetermined channel or selects the single undetermined channel if there is only one undetermined channel) and proceeds to use the selected channel for future communication. If no undetermined channels were detected at 525 then at 535 the least loaded infeasible channel is selected by the AP (if there are more than one infeasible channel or selects the single infeasible channel if there is only one infeasible channel) and proceeds to use the selected channel for future communication.

Figure 5B:
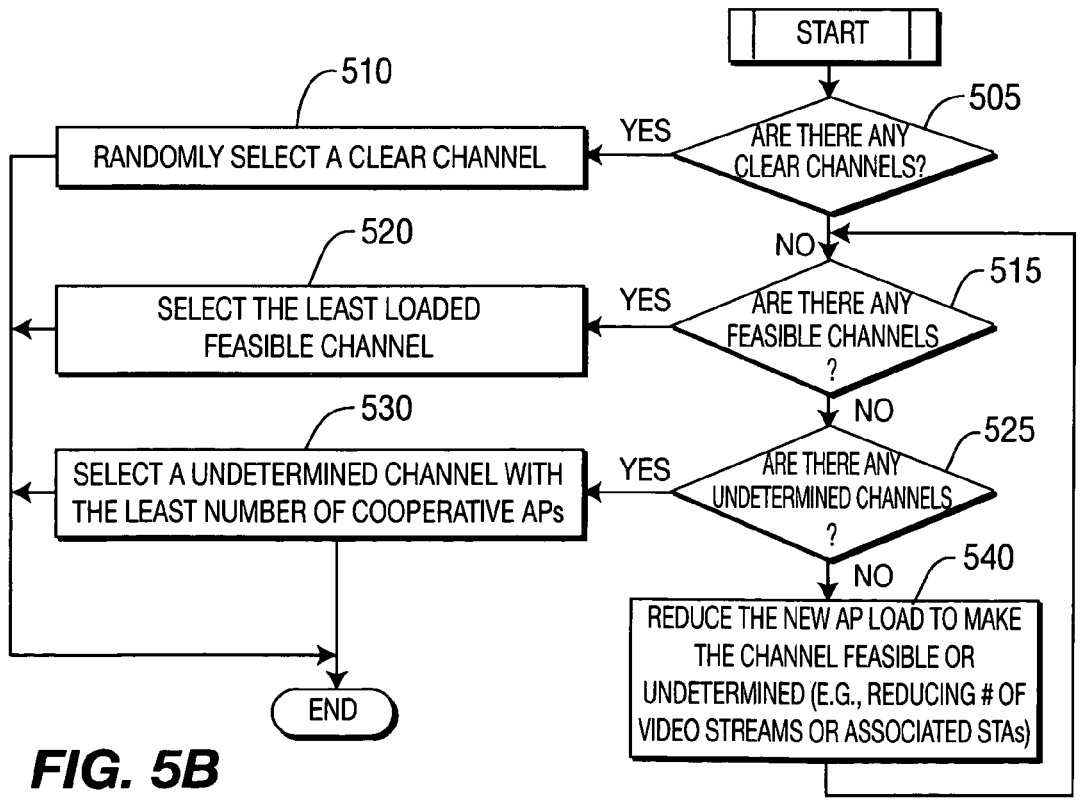
FIG. 5B is a flowchart of an alternative AP channel selection method in accordance with the principles of the present invention.

In an alternative method, if it is desirable to ensure that the quality of service (QoS) of existing cooperative BSSs will not be degraded when a new cooperative BSS joins the network, a mechanism similar to the admission control in the channel selection method can be introduced. In this case, if all the channels are infeasible, the AP needs to decrease its load to make a channel feasible or undetermined, for example, by reducing the number of video streams or associated stations, or by transcoding to reduced the bit rate of one or more of the streams. The flowchart of this alternative channel selection procedure is shown in FIG. 5B. Specifically, FIG. 5B is like FIG. 5A except that reference number 535 is replaced by reference number 540 where the AP reduces the load of any new (joining) AP to make the channel feasible or undetermined and then proceeds to step 515 to try again to select a channel. Reducing the load on the joining AP includes reducing the number of video/multimedia streams and/or reducing the number of associated stations/nodes.

Figure 6:
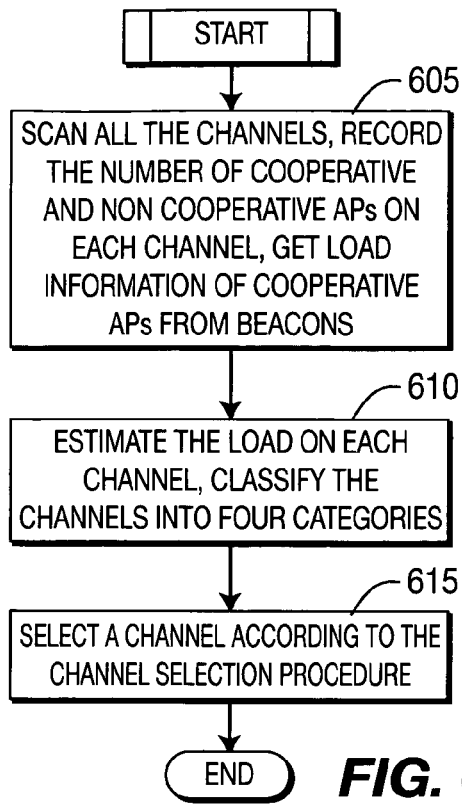
FIG. 6 is a flowchart of the AP initial channel selection method upon start up.

When a new AP boots up, it does not have the information from its clients so it will select a channel based on its own scanning results. The following describes the (initial) channel selection procedure (shown in FIG. 6) when an AP boots up. At 605 the AP scans all the channels, records the number of cooperative BSSs and non-cooperative BSSs and determines the load information of cooperative BSSs from the beacons of their APs. At 610, the AP determines the load on each channel and classifies/categorizes the channels into the four categories described above. At 615, the AP selects a channel according to the channel selection procedure in either FIG. 5A or FIG. 5B.

Figure 7:
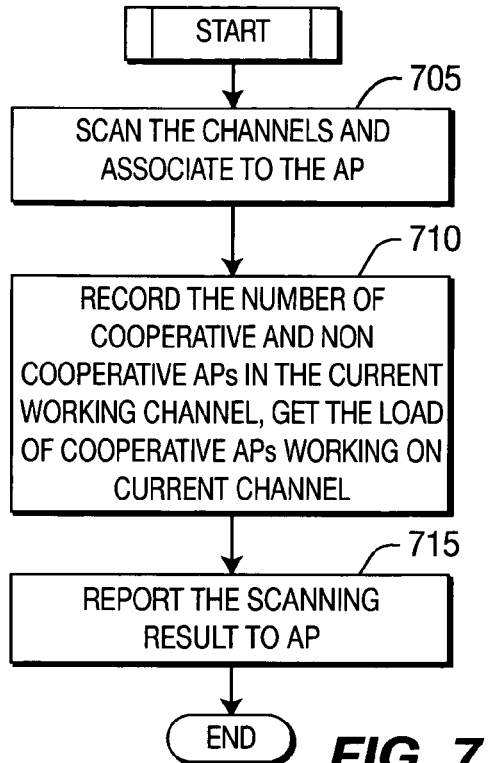
FIG. 7 is a flowchart of the station/node start up method.

When a station boots up, it will take the actions shown on the flowchart of FIG. 7. Specifically, at 705, the STA scans the channels and associates with an AP. At 710, the STA records both the number and the SSIDs of cooperative and non-cooperative BSSs on the operating (current working) channel and obtains/determines the load of the cooperative BSSs from beacons transmitted by their APs. At 715 the STA reports the scanning result to its associated AP.

When the AP received the scanning result from a station, it will take the following actions:

Build a list of hidden nodes and exposed nodes

Re-estimate the total load on the current channel

If the total load is less than the channel capacity, keep this channel and mark it as available for use If there hidden nodes or exposed nodes using this channel, activate RTS/CTS signaling Otherwise switch to another channel Once the AP of a cooperative BSS selects a channel, it continues using the selected channel until the channel becomes congested. The AP and the clients measure the status of the channel periodically to decide if a channel switch is necessary. When the packet loss rate (PLR) on this channel exceeds a predefined value/threshold $E_{max}$, the AP first determines if the channel is feasible or undetermined. If it is feasible or undetermined, then the AP tries to determine if there are hidden or exposed terminal problems. If there are hidden or exposed terminals, then the AP activates RTS/CTS signaling. After a certain period of time, if the packet loss rate is still higher than the threshold, then the AP tries to switch to another channel.

Figure 8:
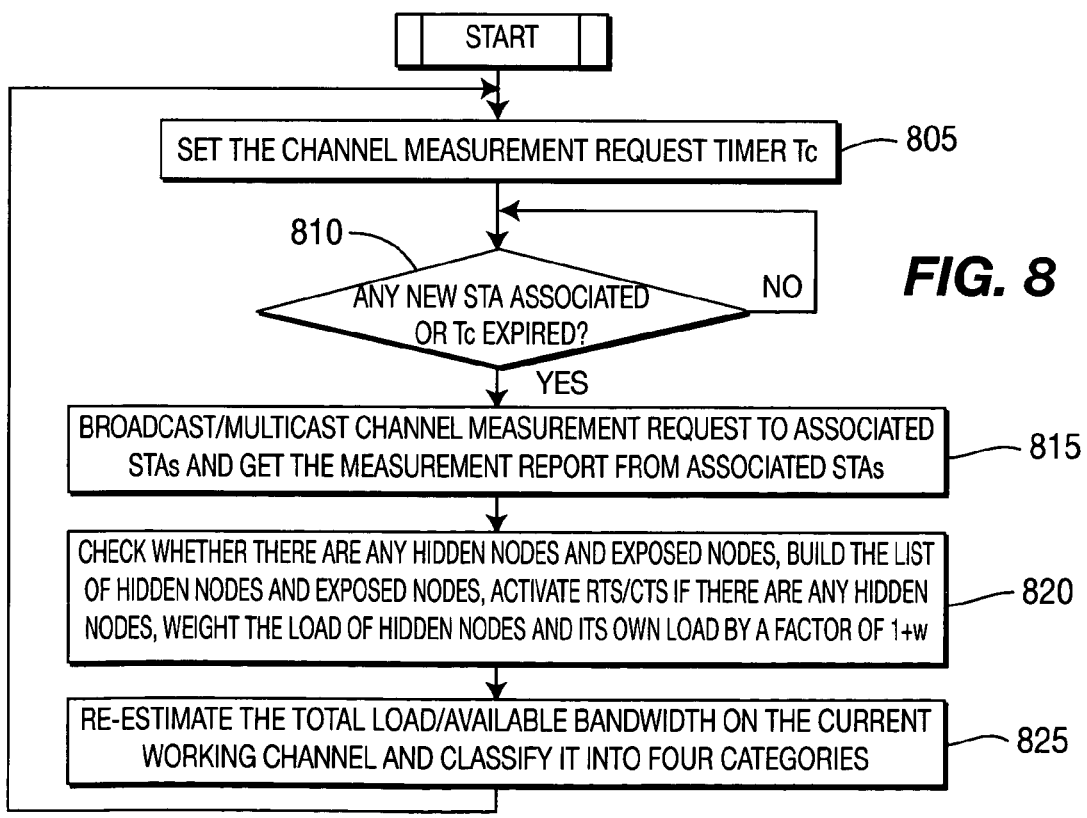
FIG. 8 is a flowchart of the AP channel measurement method in accordance with the principles of the present invention.

FIG. 8 shows the flowchart of the channel measurement procedure of the present invention. Specifically, at 805, the AP sets the channel measurement request timer. At 810, a test is performed to determine if the channel measurement request timer has expired or if any new STA has associated with the AP. If neither the channel measurement request timer has expired nor has a new STA associated with the AP then processing proceeds to step 810. If either the channel measurement request timer has expired or a new STA has associated with the AP then at 815 the AP sends/transmits/broadcasts/multicasts a channel measurement request to its associated STAs and receives channel measurement reports/results from it associated STAs. At 820, the AP determines if there are any hidden or exposed terminals (STAs) and builds a list of hidden and exposed terminals (STAs). If there are any hidden or exposed terminals (STAs) then the AP activated CTS/RTS signaling. The AP weighs the load of the hidden terminals (STAs/nodes) and its own load by a factor of 1+ω. Using this weighting the AP re-estimates the load on the current operating/working channel at 825 and classifies it into one of the four categories described above. The channel status information is used in the channel switching procedure. If the total load is less than the channel capacity, the AP and the stations will continue working on this channel.

Figure 9:
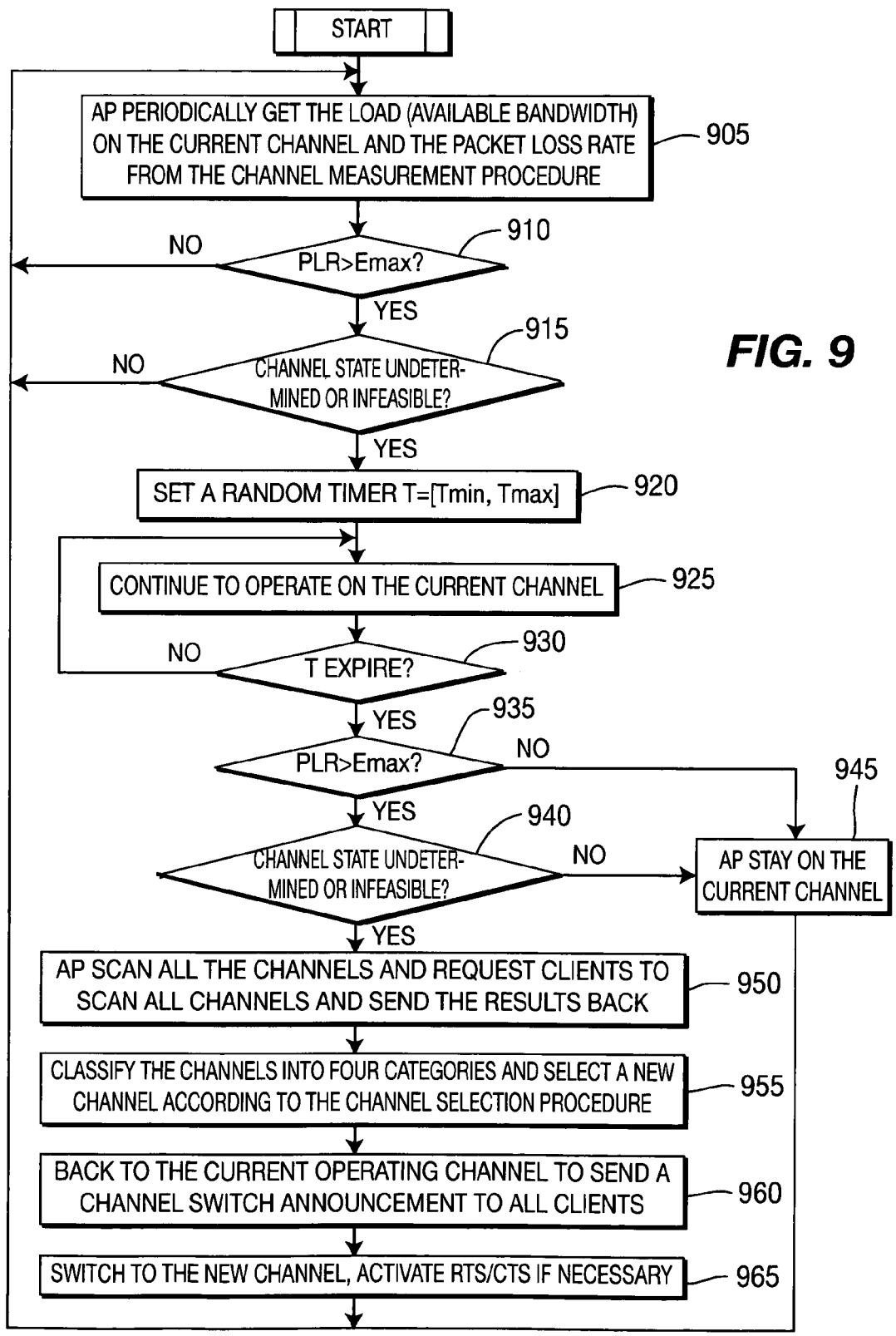
FIG. 9 is a flowchart of the AP channel switching method in accordance with the principles of the present invention.

FIG. 9 is the flowchart of channel switching procedure of the present invention. Specifically, at 905, the AP periodically determines the load (available bandwidth) on the current operating/working channel and also determines the packet loss rate from the channel measurement procedure. A test is performed at 910 to determine if the packet loss rate exceeds a threshold (value). If the packet loss rate does not exceed a threshold (value) then processing proceeds to step 905. If the packet loss rate exceeds a threshold (value) then at 915 a test is performed to determine if the status of the channel is undetermined or infeasible. If the status of the channel is not undetermined or infeasible then processing proceeds to step 905. If the status of the channel is undetermined or infeasible then a random timer is set at 920. The random timer is set to a value between two numbers (a minimum value and a maximum value). At 925 the AP continues to operate on the current (working/operating) channel. At 930 a test is performed to determine if the random timer has expired. If random timer has not expired, then processing proceeds to step 925. If random timer has expired, then a test is performed at 935 to determine if the packet loss rate exceeds a threshold (value). If the packet loss rate does not exceed a threshold (value) then at 945 the AP continues to operate on the current (operating/working) channel. If the packet loss rate exceeds a threshold (value) then a test is performed at 940 to determine if the status of the channel is undetermined or infeasible. If the status of the channel is not undetermined or infeasible, then processing proceeds to 945. If the status of the channel is undetermined or infeasible then at 950 the AP scans all the channels and requests its associated clients/nodes/terminals/STAs to scan all the channels and return the results of their channels scans to their associated AP. At 955 once the AP receives the channel scan reports from its associated clients/nodes/terminals/STAs, the AP classifies the available channels into one of four categories (clear, feasible, infeasible, undetermined as described above) and selects a new operating channel according to the channel selection procedure described above and shown in either FIG. 5A or FIG. 5B. At 960 the AP (using the current operating channel) sends a channel switch announcement message to all of its associated clients/nodes/terminals/STAs. The AP then switches to the selected new operating/working channel at 965 and activates RTS/CTS signaling if necessary based on a determination of hidden or exposed terminals/STAs/clients/terminals.

Figure 10:
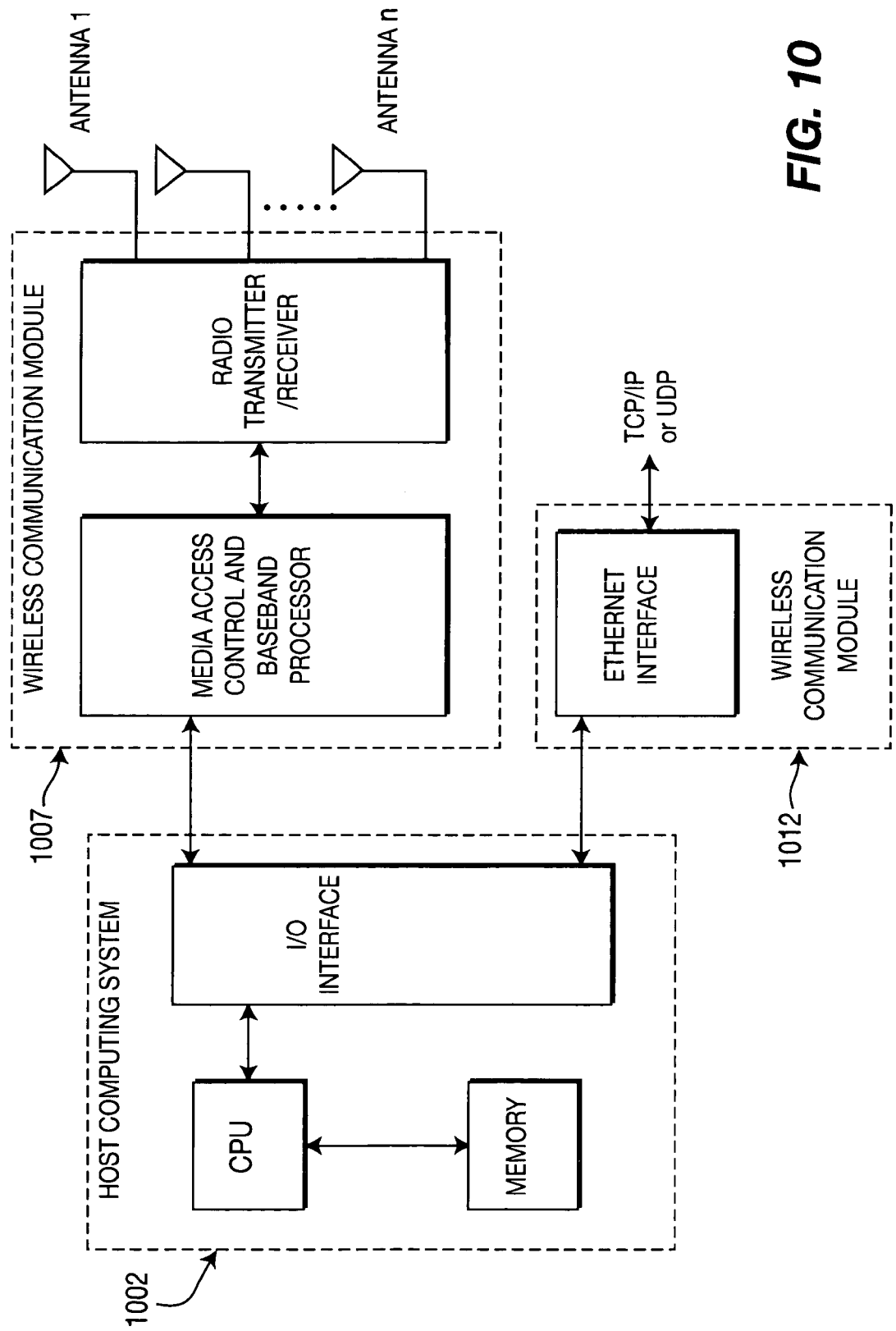
FIG. 10 is a block diagram of an AP an/or a station/node in accordance with the principles of the present invention.

FIG. 10 is a block diagram of an exemplary implementation of the present invention for a STA and/or an AP. As a STA and/or an AP can be a transmitter, a receiver or a transceiver, a single block diagram is used to describe these devices. Each device includes a host computing system (1002), a wireless communication module (1007) and a wired communication module (1012). The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The radio transmitter/receiver may be a transceiver or a separate transmitter and receiver. The MAC and baseband processor performs MAC control and data framing, modulation/demodulation, coding/decoding for the transmission/receiving. The wired communication module can be an Ethernet interface communicating with other devices using TCP/IP or UDP protocol. Usually an AP and a STA communicate with each other through a wireless channel, an AP connect to the backhaul using wired interface. A STA can communicate with other devices such as computer or TV using wired interface. For a STA, functionalities of channel measurement, transmitting the channel measurement report to its associated AP, receiving channel assignment and hidden and exposed nodes/terminals list from its associated AP, and activating RTS/CTS signaling are performed by the wireless communication module. For an AP, functionalities of channel measurement, transmitting channel measurement request and receiving channel measurement reports from associated STAs and transmitting channel assignment and hidden and exposed nodes/terminals list to STA are performed by the wireless communication module.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for assigning channels in a wireless local area network for real-time communications in a dense deployment environment, said method comprising:

categorizing each channel into one of at least 3 categories;
selecting a channel from a first category of channels, if there are any channels in said first category of channels;
selecting a channel from a second category of channels, if there are any channels in said second category of channels; and
selecting a channel from a third category of channels, if there are any channels in said third category of channels wherein the first category of channels includes clear channels, wherein the second category of channels includes feasible channels, and wherein the third category of channels includes infeasible channels;
scanning all channels;
recording a number of cooperative access points;
recording a number of non-cooperative access points;
determining load information of a cooperative access point from a beacon message transmitted by said access point; and
estimating a load on each channel responsive to results of scanning all channels.

2. The method according to claim 1, further comprising selecting a least loaded channel from a fourth category of channels, wherein said fourth category of channels includes undetermined channels.

3. The method according to claim 1, further comprising reducing a load on an access point joining said dense deployment environment.

4. The method according to claim 3, wherein reducing said load includes one of reducing a number of multimedia streams and reducing a number of associated nodes and reducing bit rate of multimedia stream using transcoding.

5. The method according to claim 1, further comprising receiving channel measurement results from nodes associated with an access point.

6. The method according to claim 5, further comprising:
initializing a channel measurement request timer;
transmitting a channel measurement request message to associated nodes;
building a list of hidden nodes;
building a list of exposed nodes;
activating request to send-clear to send signaling if said hidden node list or said exposed node list is not empty;
applying a weight to any hidden nodes;
applying a weight to said load on said current operating channel;
re-estimating a load on a current operating channel; and
responsive to said load performing one of continuing to communicate over said current operating channel and switching to another operating channel.

7. The method according to claim 6, wherein said weight is 1+ω.

8. The method according to claim 5, wherein said channel measurement results include a packet loss rate.

9. The method according to claim 6, further comprising transmitting a channel switch announcement message to associated nodes over said current operating channel.

10. The method according to claim 6, wherein said load re-estimation is responsive to said channel measurement results including said packet loss rate.

11. An apparatus for assigning channels in a wireless local area network for real-time communications in a dense deployment environment comprising:
means for categorizing each channel into at least 3 categories;
means for selecting a channel from a first category of channels, if there are any channels in said first category of channels;
means for selecting a channel from a second category of channels, if there are any channels in said second category of channels; and
means for selecting a channel from a third category of channels, if there are any channels in said third category of channels, wherein the first category of channels includes clear channels, wherein the second category of channels includes feasible channels, and wherein the third category of channels includes infeasible channels;
means for scanning all channels;
means for recording a number of cooperative access points;
means for recording a number of non-cooperative access points;
means for determining load information of a cooperative access point from a beacon message transmitted by said access point; and
means for estimating a load on each channel responsive to results of scanning all channels.

12. The apparatus according to claim 11, further comprising means for selecting a least loaded channel from a fourth category of channels, wherein said fourth category of channels includes undetermined channels.

13. The apparatus according to claim 11, further comprising means for reducing a load on an access point joining said dense deployment environment.

14. The apparatus according to claim 11, further comprising means for receiving channel measurement results from nodes associated with an access point.

15. The apparatus according to claim 14, further comprising:
means for initializing a channel measurement request timer;
means for transmitting a channel measurement request message to associated nodes;
means for building a list of hidden nodes;
means for building a list of exposed nodes;
means for activating request to send-clear to send signaling if said hidden node list or said exposed node list is not empty;
means for applying a weight to any hidden nodes;
means for applying a weight to said load on said current operating channel;
means for re-estimating a load on a current operating channel; and
means for responsive to said load performing one of continuing to communicate over said current operating channel and switching to another operating channel.

16. The apparatus according to claim 15, further comprising means for transmitting a channel switch announcement message to associated nodes over said current operating channel.

17. An apparatus for assigning channels in a wireless local area network for real-time communications in a dense deployment environment comprising:
a processor, for categorizing each channel into at least 3 categories, the processor selecting a channel from a first category of channels, if there are any channels in said first category of channels, selecting a channel from a second category of channels, if there are any channels in said second category of channels; and selecting a channel from a third category of channels, if there are any channels in said third category of channels, wherein the first category of channels includes clear channels, wherein the second category of channels includes feasible channels, and wherein the third category of channels includes infeasible channels;

a wireless communication module for scanning all channels;

a memory, connected to the processor, for recording a number of cooperative access points and a number of non-cooperative access points;

wherein the processor determines load information of a cooperative access point from a beacon message transmitted by said access point; estimates a load on each channel responsive to results of scanning all channels.

18. The apparatus according to claim 17, wherein the processor further acts to select a least loaded channel from a fourth category of channels, wherein said fourth category of channels includes undetermined channels.

19. The apparatus according to claim 17, wherein the processor further acts to reduce a load on an access point joining said dense deployment environment.

20. The apparatus according to claim 17, wherein the wireless communication module further acts to receive channel measurement results from nodes associated with an access point.

* * * * *